(12) United States Patent
Aizpuru et al.

(10) Patent No.: US 9,057,876 B2
(45) Date of Patent: Jun. 16, 2015

(54) ICWS PERISCOPE

(71) Applicant: Optex Systems, Inc., Richardson, TX (US)

(72) Inventors: Jose Joaquin Aizpuru, Dallas, TX (US); Koko K. Katanjian, Irving, TX (US)

(*) Notice: Subject to any disclaimer, the term of this patent is extended or adjusted under 35 U.S.C. 154(b) by 232 days.

(21) Appl. No.: 13/792,297

(22) Filed: Mar. 11, 2013

(65) Prior Publication Data
US 2014/0254035 A1    Sep. 11, 2014

(51) Int. Cl.
*G02B 23/08* (2006.01)
*G02B 23/22* (2006.01)

(52) U.S. Cl.
CPC ...................................... *G02B 23/08* (2013.01)

(58) Field of Classification Search
None
See application file for complete search history.

(56) References Cited

U.S. PATENT DOCUMENTS 4,065,206 A      12/1977  Tausch
4,149,778 A  *   4/1979   Tausch ........................... 359/857

* cited by examiner

*Primary Examiner* — Jade R Chwasz
(74) *Attorney, Agent, or Firm* — Carl F. Melito

(57) ABSTRACT

A periscope construction having a ballistic guard formed inside a protective housing, and optical system mounted therein having first and second blocks of optical material mounted at opposite ends; first and second reflective surfaces, and the object and eyepiece viewing surfaces of the respective blocks being generally parallel and forming a parallelogram in cross section; the first and second end surfaces being spaced from each other within the housing with at least one layer of transparent armor therebetween to deflect incoming projectiles away from the object viewing section; and may include at least one layer of transparent armor rigidly positioned at an angle relative to the field of view no less than 300° to a maximum of 360° which is parallel to the field of view. It may further include a high grade metallic band rigidly formed around and adjacent the space between the first and second end surfaces.

7 Claims, 12 Drawing Sheets

ICWS PERISCOPE

FIELD OF THE INVENTION

This invention relates generally to an improved ballistic protected periscope construction mounted within an armored vehicle. More specifically, the invention relates to an improved ballistic protected periscope that deflects incoming projectiles to minimize, and preferably eliminate, fractured pieces of the projectiles, and of the periscope itself, from entering the interior of the vehicle while maintaining high visibility.

BACKGROUND

Many military vehicles in use today employ what is called an Integrated Commander's Weapon Sight (ICWS) (also referred to as an "Improved Commander's Weapon Station". The commander in any armored military vehicle must maintain both situational awareness (visibility outside the vehicle) and safety inside the vehicle. Current ICWS Periscopes in use today typically consist of several common elements. These are:
  Top Block
  Bottom Block
  Housing Cover
  Reflective Top Minor
  Sealing Adhesive
  Main Housing
  Viewing Window
  Reflective Bottom Minor
  Top Gap
  Bottom Gap
  Laser Filter
  Optical Adhesive
  Plate Armor The top and bottom blocks make up most of the volume of the complete assembly. They are typically made of glass. The top block serves as the entry point for the external incoming image. It has a mirrored back face that reflects the image and a bottom face that usually has a laser filter bonded to it with an optical adhesive to protect the commander from harmful wavelengths of light. The bottom block also has a mirrored back face to again reflect the incoming image to an exit face on the bottom block. Another typical feature in the optical path is a polycarbonate window which is used to help prevent any blowout of glass should a projectile travel through the unit and shatter both pieces of glass. The rest of the assembly is usually composed of adhesives and housings that hold it all together; along with a ballistic guard which is an armored plate of sorts, designed to prevent projectile fragments from penetrating the interior of the vehicle should they succeed in penetrating the top block.

Two primary weaknesses are prevalent among existing ICWS Periscopes on the market: 1) leakage that affects visibility; and 2) safety issues. Pertaining to the former, existing designs employ an air gap positioned between the laser filter and the bottom block. A standoff is usually placed between the top and bottom blocks of glass to form this gap. The purpose of the gap was purportedly to reduce the "shock", or transfer of energy, from one block to the other if a projectile fragment entered the top block. The problem this created, however, was that the device no longer was "leak proof", and any moisture that enters the periscope and resides in that gap will cause a drastic reduction in optical performance of the periscope, thus hindering the commander's visibility. As regards the latter, as weapons become more powerful with technological advances, the use of glass to form the top and bottom blocks is no longer considered safe. The glass employed in existing designs was never intended to deal with high velocity and high trajectory projectiles. The armored plate has been the only mechanism currently in use to serve this purpose. What is needed are new materials and structural changes to existing designs to improve ICWS Periscopes of the future for greater effectiveness and safety.

SUMMARY

One aspect of the present invention includes a periscope construction of the type having a protective housing and an optical system mounted within the housing, in which the optical system comprises:
(a) a first block of optical material forming an object viewing section having an object viewing surface, a first reflective surface and a first end surface;
(b) a second block of optical material forming an eyepiece viewing section having an eyepiece viewing surface, a second reflective surface, and a second end surface;
(c) said first and second blocks being mounted at generally opposite ends of the protective housing with the first and second reflective surfaces, and the object and eyepiece viewing surfaces being generally parallel with respect to each other and forming a parallelogram in cross section, and with the first and second end surfaces being spaced from each other within the protective housing with at least one layer of transparent armor filling the space therebetween parallel to the field of view to deflect incoming projectiles from striking the object viewing section. The periscope construction may include at least one layer of transparent armor rigidly positioned at an angle relative to the field of view no less than 300° to a maximum of 360° which is parallel to the field of view. It may further include a high grade metallic band rigidly formed around and adjacent the space between the first and second end surfaces. The protective housing may further comprise a high grade metallic ballistic guard formed inside as part of an inner wall of the housing facing the field of view positioned substantially adjacent and extending above the space between the first and second end surfaces of the first and second blocks.

Another aspect of the invention is to remove the air gap and to use a stack up of ballistic tested glass to deflect, rather than absorb, projectile fragments. Although ballistic glass is not new in the industry, it is currently not employed in periscopes as a means to redirect the energy of a high velocity projectile. Ballistic glass is typically used in windows of armored vehicles that employ a "direct view" concept, not in products that have a folded optical path such as that employed in periscopes. As a projectile enters these types of ballistic window stack ups, the energy is deflected such that the projectile tends to stray away from a perpendicular path through the window and, instead, is redirected toward becoming parallel to the bond lines.

Another improvement is to employ a high grade metallic material to form the ballistic armored plate (or plate stack up). Yet another improvement is to use this new material to form and place an additional armored plate or band of proven thickness in the front of the device such that the entry zone of the projectile is protected. Since such a configuration could reduce the optical viewing zone so much that it could hinder the commander's field of view, its placement must not block the bottom half of the entry window.

DETAILED DESCRIPTION OF VARIOUS PREFERRED EMBODIMENTS

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two, or more than two. The term another, as used herein, is defined as at least a second or more. The terms including and/or having, as used herein, are defined as comprising (i.e., open language). While particular configurations of the invention are shown in FIGS. 3-11, those skilled in the art will appreciate that variations and modifications are possible, and such variations and modifications are within the scope of the invention.

Figure 1A:
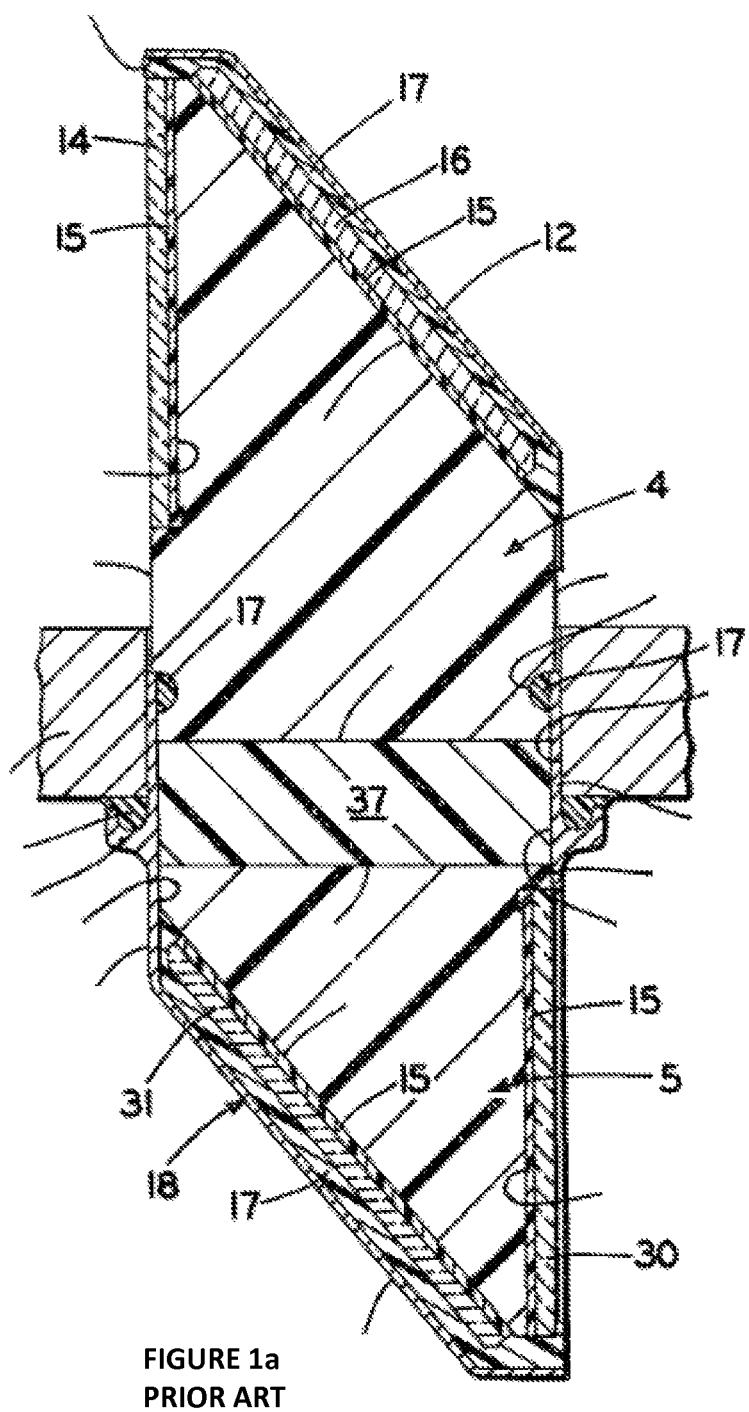
FIG. 1a illustrates a typical prior art implementation of a protected ballistic periscope taken from U.S. Pat. No. 4,065,206 BALLISTIC PROTECTED PERISCOPE CONSTRUCTION (Tausch)

FIG. 1a illustrates PRIOR ART. It is taken from U.S. Pat. No. 4,065,206 BALLISTIC PROTECTED PERISCOPE CONSTRUCTION (Tausch). Several elements within that construction are key conceptual elements for this discussion and have been highlighted below, per numbering sequence within U.S. Pat. No. 4,065,206:

4 Top Block
5 Bottom Block
12 Housing Cover
14 Object Window
15 Optical Adhesive
16 Reflective Top Minor
17 Sealing Adhesive
18 Main Housing
30 Viewing Window
31 Reflective Bottom Minor
37 Cushioning Material It is important to understand that the construction and elements of this periscope are defined within the disclosure itself as having characteristics which 1) are shock absorbing, 2) are meant to reduce transmission of shock waves, 3) are meant to provide shock isolation effects between solid materials by means of soft pliable materials, etc.

Figure 1B:
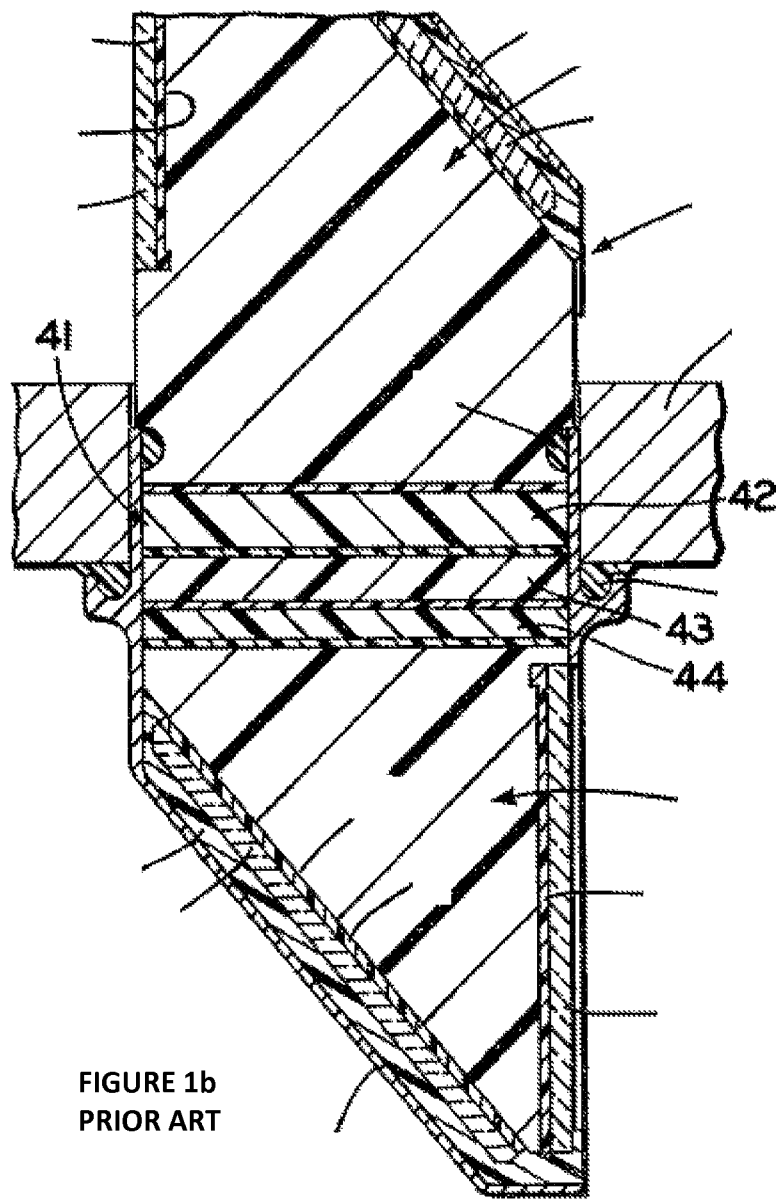
FIG. 1b further illustrates the prior art implementation of U.S. Pat. No. 4,065,206 (Tausch), but differs from FIG. 1a in that the cushioning material (37) from FIG. 1a made of soft pliable material is replaced by a plurality of blocks of polycarbonate or laminate (41, 42, 43, 44) that can be of varying thicknesses, all bonded with the cushioning material (37)

FIG. 1b is also PRIOR ART from U.S. Pat. No. 4,065,206 but differs from FIG. 1a in that the cushioning material (37) from FIG. 1a made of soft pliable material is replaced by a plurality of blocks of polycarbonate or laminate (41, 42, 43, 44) that can be of varying thicknesses at varying angles, all bonded with the cushioning material (37). By definition, Tausch's solid materials are absorptive to fulfill the purpose of the Tausch design, which is to absorb the shock of an incoming projectile. This is in stark contrast to the improved design disclosed herein; a design employing transparent armor which is intended not to absorb the shock of a projectile, but instead to deflect the projectile, which is by definition bulletproof glass, and therefore a non-absorptive solid.

Figure 2:
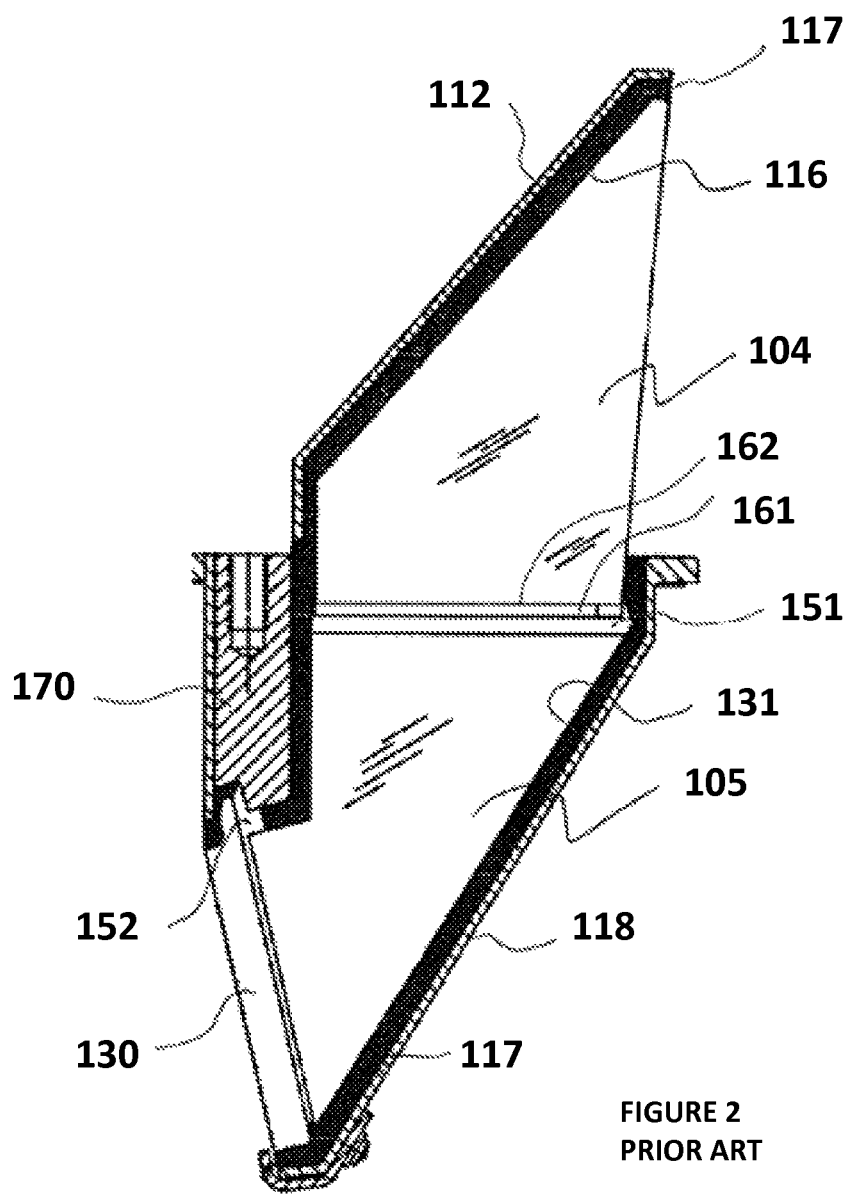
FIG. 2 illustrates a prior art cross-section of a periscope assembly found in United States Government Ordinance Drawing No. 12548774 Rev G.

FIG. 2 also illustrates PRIOR ART. It is a cross-section of a periscope assembly found in United States Government Ordinance Drawing No. 12548774 Rev G. It consists of the following elements: (Please note that the item numbering sequence is such that similar items will have the same base number. For example, the top block, whose function is similar to all three designs discussed, will be numbered 4, 104, and 204 respectively.)

104 Top Block
105 Bottom Block
112 Housing Cover
116 Reflective Top Minor
117 Sealing Adhesive
118 Main Housing
130 Viewing Window
131 Reflective Bottom Minor
151 Top Gap
152 Bottom Gap
161 Laser Filter
162 Optical Adhesive
170 Plate Armor In this construction, there are gaps (151 and 152) intentionally left within the design which serve as shock isolation areas and are intended to be filled with inert gas such as dry nitrogen to avoid moisture or dirt from affecting the optical transmission of the periscope. In this design, the viewing window (130) is made of a polycarbonate and is intended to remain intact should a small portion of the transmitted shock wave reach the window. Obviously, if the projectile reaches the window (130) with a certain velocity or the shock wave reaches the window with certain amplitude, the polycarbonate window will not protect sufficiently.

In U.S. Pat. No. 4,065,206, these gaps are 1) characterized as a fault with the design since humidity/water leaking can occur and 2) are the main basis for the design change. Coincidentally, leaking is the main reason for failure in the field of the current design defined by United States Government Ordinance Drawing No. 12548774.

Another characteristic of the government design (FIG. 2) is that it does contain a plate of armor (170) as part of the product that is intended to stop penetration of a projectile into the interior vehicle space. If it is not stopped, it could potentially harm the human viewer or occupants of the vehicle not only as a solid projectile, but by the glass shattered within the confined vehicle space. This characteristic is not contained in the product defined by U.S. Pat. No. 4,065,206. The main concern for this armor plate is that although it may have served a purpose earlier in its lifetime, current tests have shown a weakness or even catastrophic failure with today's higher power and higher velocity projectiles.

A third characteristic of the government design in FIG. 2 is that of laser protection provided by the laser filter (161) which is bonded to the top block (104) with optical adhesive (162) of a different type than referenced in U.S. Pat. No. 4,065,206.

This laser filtering characteristic is not crucial in defining the ballistic protection of the design; however, it is mentioned for reference because it will be referenced in the present invention defined below.

Figure 3:
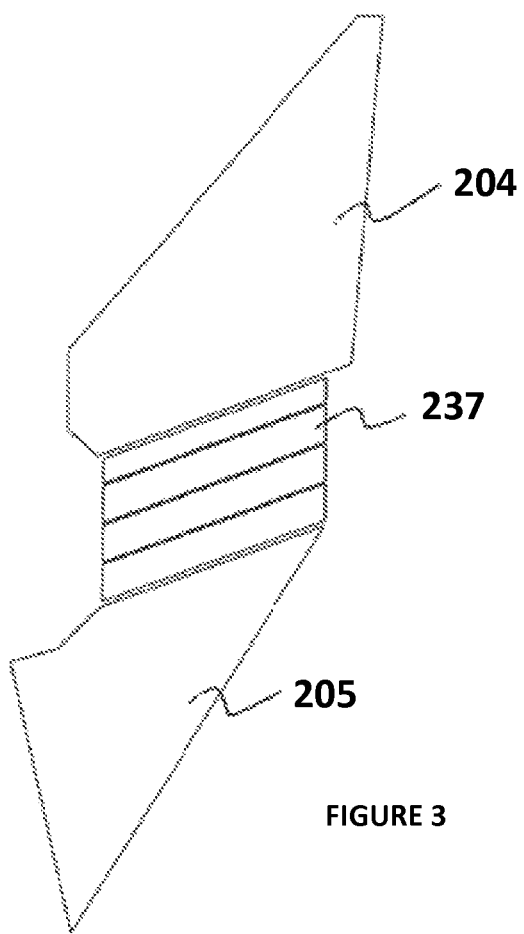
FIG. 3 illustrates a partial assembly of one embodiment of the present invention.

Consider the present invention defined in the following figures:

FIG. 3 shows a partial assembly of the present invention. It contains a top block (204), a transparent armor block (237), and a bottom block (205). Both the top block and bottom block have incorporated mirrored surfaces to resemble the functions of the mirrors (16, 31) in FIG. 1. FIG. 2 also has these mirrors incorporated into the blocks (104, 105) themselves and hence has no individual mirror elements either.

Figure 4:
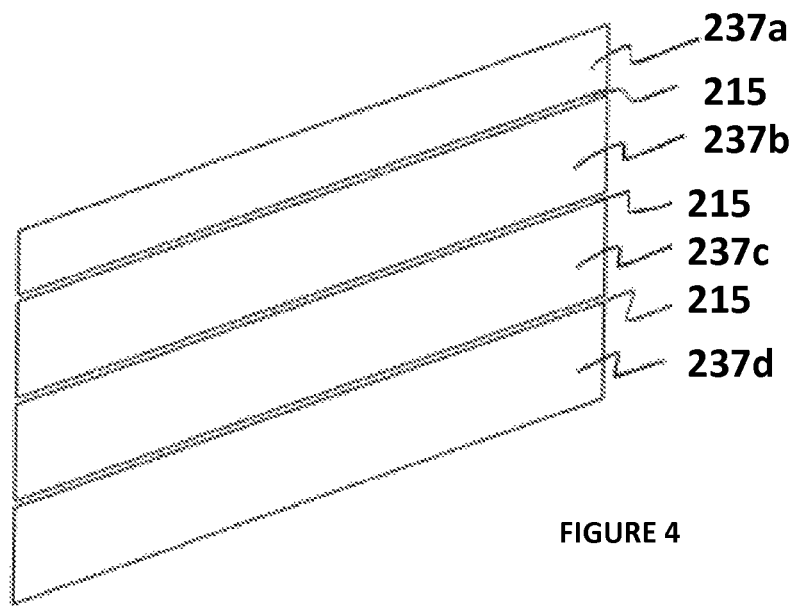
FIG. 4 depicts a transparent armor block made of varying thicknesses of glass.

FIG. 4 shows the transparent armor block (237) is made of varying thicknesses of glass (237a, 237b, 237c, 237d, minimum of 2 layers but shown here with 4 layers) bonded with optical adhesive (215) and is similar to the plurality of blocks (41, 42, 43, 44) in FIG. 1a. It is important to note that they not only serve the function of slowing the projectile and shock wave, but they are designed and placed in the assembly such that they also redirect the projectile itself. This design feature creates a non-square parallelogram shaped cross-section.

Figure 5:
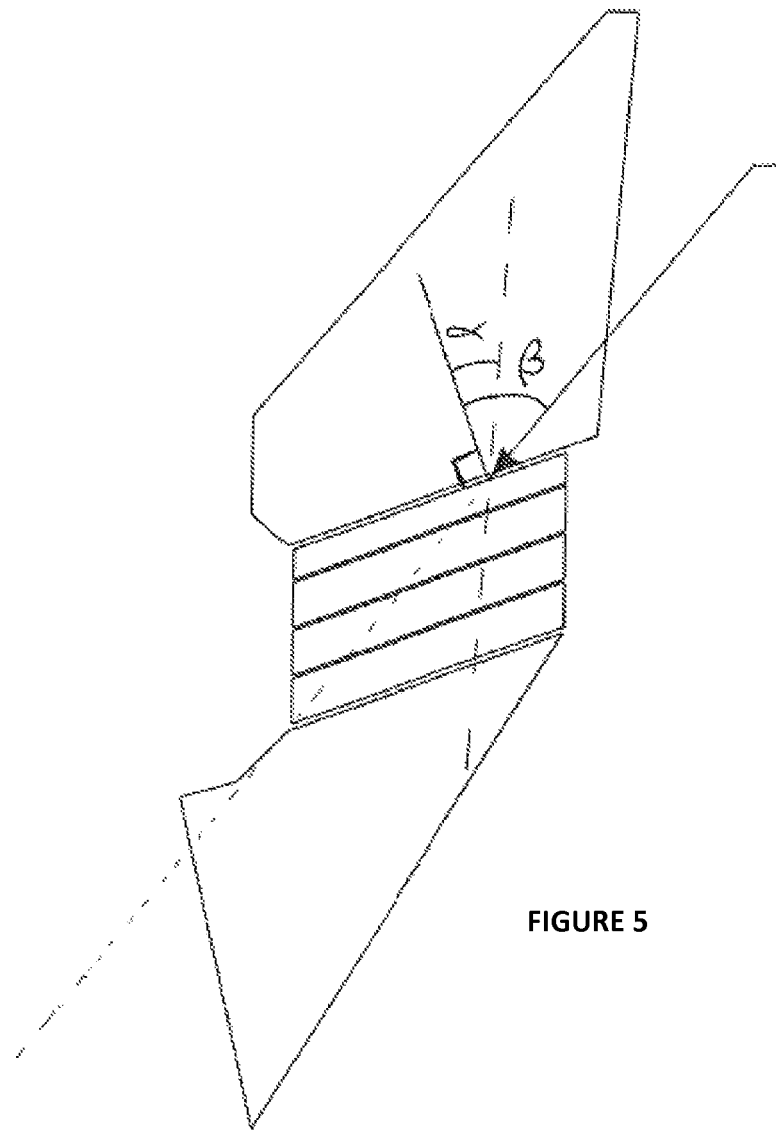
FIG. 5 depicts how a projectile is redirected once it impacts the transparent armor block.

FIG. 5 shows how the projectile is redirected once it impacts the transparent armor block (237). The closer the projectile impacts the transparent armor block to orthogonal, the less redirecting effect it will have on the projectile. As you turn the block counterclockwise away (increase angle alpha) from the entry point for a projectile, the larger angle beta becomes for a given projectile angle of entry. As beta increases toward, say 45 degrees for example, the more redirecting effect you create on the projectile toward the vertical rear wall of the transparent armor block and away from the adhesion point between the transparent armor block (237) and the bottom block (205).

Figure 6:
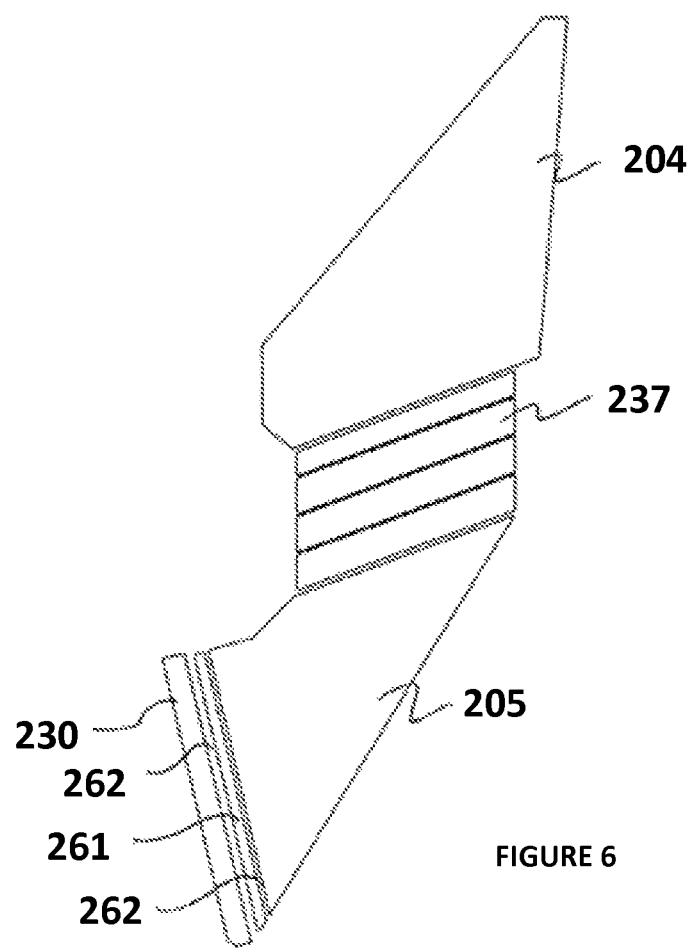
FIG. 6 illustrates the relocation of the laser filter and optical bonding adhesive with the gaps of the prior removed.

FIG. 6 shows the relocation of the laser filter (261) and optical bonding adhesive (262) since the gaps (151, 152) were removed from the design in FIG. 2. This is only shown for reference because it is still an integral part of the design for protection of the user. FIG. 6 also shows the addition of the bonding line between the polycarbonate window (230) and the laser filter (261), which eliminates the bottom gap (152) from the design in FIG. 2.

Figure 7:
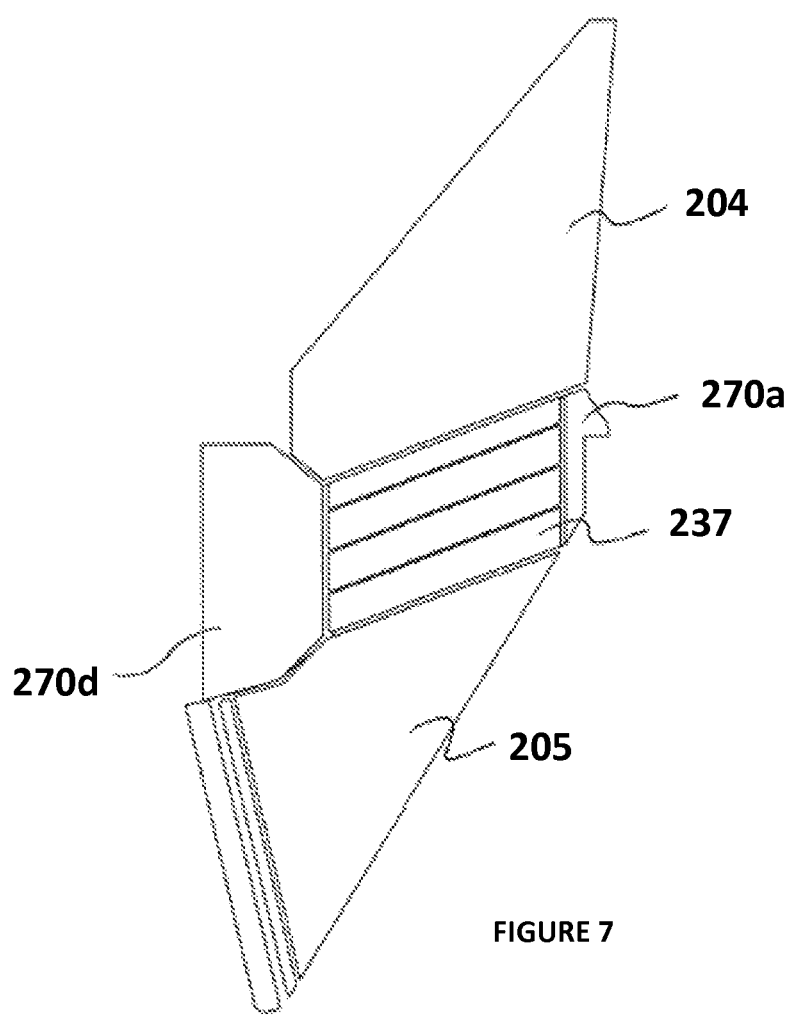
FIG. 7 illustrates an armored plate belt (or band) inserted in the assembly such that the front and back of the assembly is protected.

FIG. 7 shows the next critical element of the present invention. An armored plate belt assembly (270) is inserted such that the front and back of the assembly is protected by an armored plate of characteristics much more reliable than the design of the prior armor plate (170) defined in FIG. 2. The front portion of the armored plate belt assembly (270a) is located such that a projectile impacting just below the lowest part of the top block (204) is stopped before entering the glass structure. The shock wave may transmit into the glass, but the projectile will be stopped. A projectile impacting at the entry face of the top block (204) not having a high enough angle of trajectory to impact the transparent armor block (237) will not penetrate into the vehicle, nor will its shock wave. A projectile impacting at the entry face with a large enough angle of trajectory to impact the transparent armor block (237) will be redirected onto the face of the rear portion of the belt (270d) and stopped, as described in FIG. 5. It should be noted that the reason for redirecting the projectile toward the vertical wall of the transparent armor block (237) is so that the projectile impacts the rear of the armor plate belt assembly (270d). Working in tandem, the transparent armor block (237), the armor plate belt assembly (270), and the polycarbonate bottom window (230) create a method for containing the shock wave and the projectile from penetrating through the periscope and hence into the vehicle.

Figure 8:
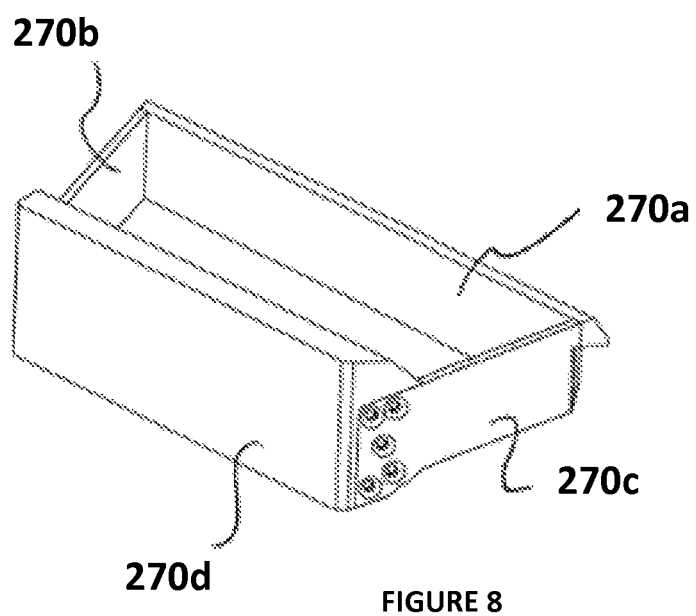
FIG. 8 shows the complete armored plate belt assembly made up of four plates welded or bolted together so that the entire perimeter of the assembly is protected.

FIG. 8 shows the complete armored plate belt assembly (270) made up of four plates (270 a, b, c, d) welded or bolted together. Only front plate (270a) and rear plate (270d) are shown in FIG. 7.

Figure 9:
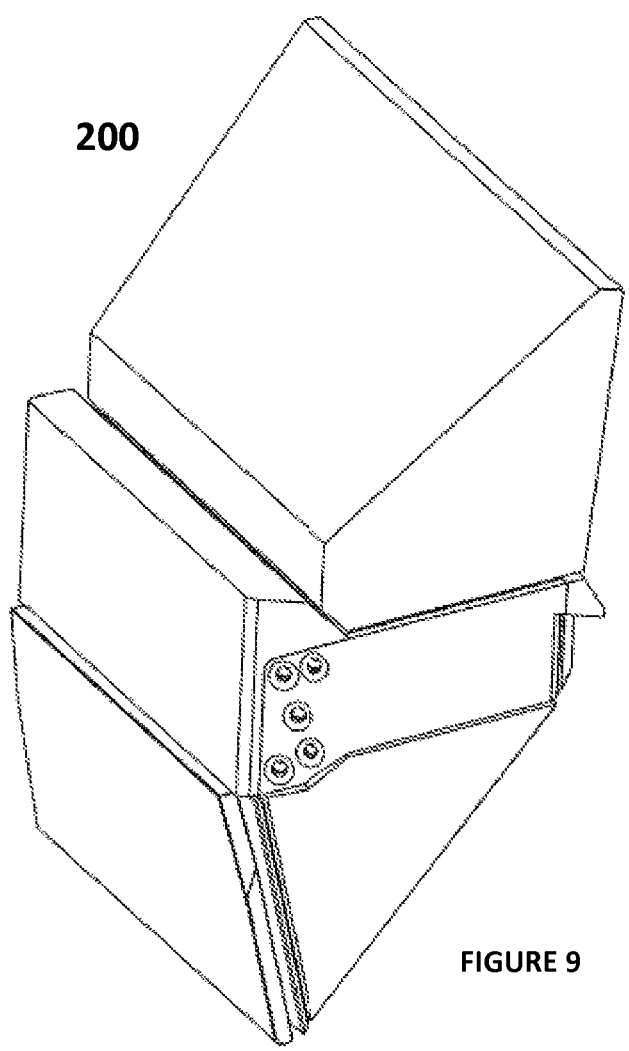
FIG. 9 shows a complete assembly without the top or bottom covers.
Figure 10:
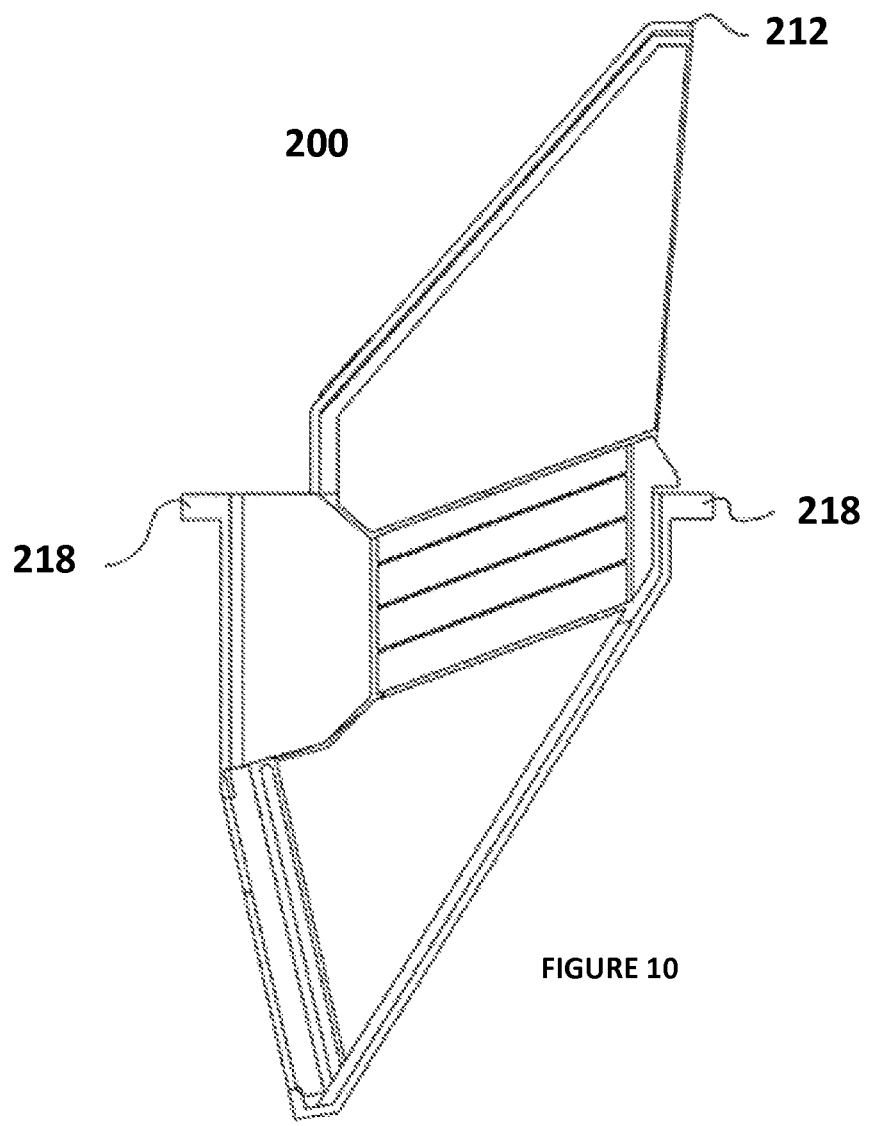
FIGS. 10 and 11 show the complete assembly with the top and bottom covers.
Figure 11:
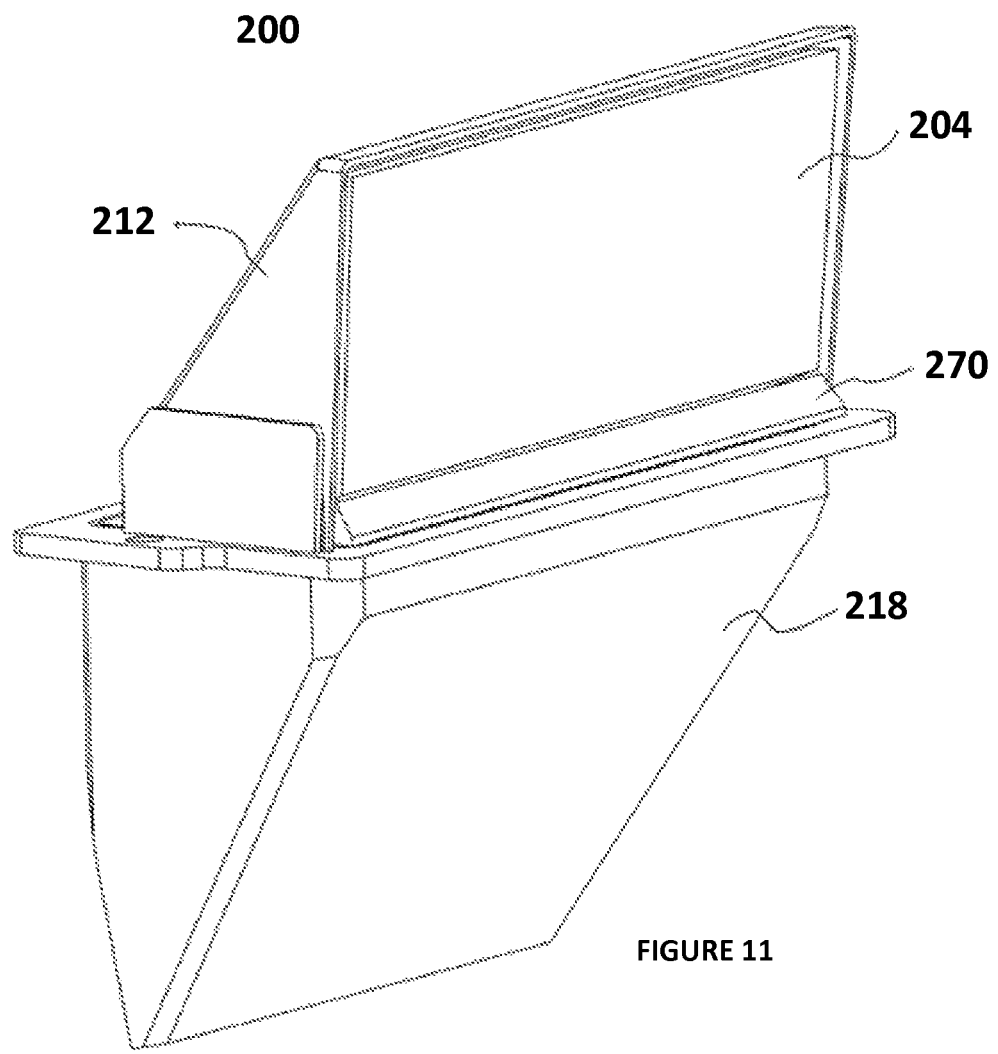

FIG. 9 shows the complete assembly (200) without the top cover (212), bottom cover (218), or seal adhesive (not shown). FIGS. 10 and 11 show the complete assembly (200) with the top cover (212) and bottom cover (218). The seal adhesive will be added last to ensure leaking is prevented within the system.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A periscope construction of the type having a protective housing and an optical system mounted within the housing, in which the optical system comprises:
    (a) a first block of optical material forming an object viewing section having an object viewing surface, a first reflective surface and a first end surface;
    (b) a second block of optical material forming an eyepiece viewing section having an eyepiece viewing surface, a second reflective surface, and a second end surface;
    (c) said first and second blocks being mounted at generally opposite ends of the protective housing with the first and second reflective surfaces, and the object and eyepiece viewing surfaces being generally parallel with respect to each other and forming a parallelogram in cross section within the protective housing with at least one layer of transparent armor therebetween, thus removing any air gap, and parallel to the field of view to deflect incoming projectiles from striking the object viewing section, wherein said protective housing further comprises a high grade metallic ballistic guard formed inside as part of an inner wall of the housing facing the field of view positioned substantially adjacent and extending above the first and second end surfaces of said first and said second blocks.

2. The periscope construction of claim 1 wherein said at least one layer of transparent armor is rigidly positioned at an angle relative to the field of view no less than 300° to a maximum of 360° which is parallel to the field of view.

3. A ballistic protected periscope construction adapted to be mounted on an armor vehicle including:
    (a) housing;
    (b) a first solid block of transparent material mounted within the housing and partially exposed to the exterior of the vehicle and susceptible to be struck by a projectile;

(c) a second solid block of transparent material mounted within the housing and partially exposed to the interior of the vehicle, with said first and second blocks forming part of an optical system for viewing an exterior field of view from within the armored vehicle through said blocks;

(d) the first and second blocks within the housing having at least one layer of transparent armor therebetween, thus removing any air gap, and parallel to the field of view to deflect incoming projectiles that strike the first block, and (e) wherein the housing further comprises a high grade metallic ballistic guard formed inside as part of an inner wall of the housing facing the field of view positioned substantially adjacent and extending above first and second end surfaces of said first and said second blocks.

4. The construction of claim 3 wherein said at least on layer of transparent armor has a generally rectangular cross-sectional shape forming at least two parallel walls between the first and second blocks, each of said blocks having a flat surface which is parallel to the other.

5. The construction of claim 4 wherein each of said at least one layer of transparent armor is bonded to each respective flat surface of said first and second blocks using a clear optical adhesive that bonds the parallel wall surfaces to the respective block surfaces.

6. In an improved periscope construction of the type having a pair of generally prismatic-shaped blocks of optical material, each having a viewing window and a reflector surface, which blocks are mounted within a protective housing and form an optical system for viewing an external field of view from within the interior of a protected object, wherein the improvement includes: at least one layer of transparent armor having at least a pair of transparent top and bottom walls, said at least one layer of transparent armor being mounted between the pair of blocks with each of said walls being located adjacent a respective block, thus removing any air gap, for deflecting incoming projectiles that strike between said blocks, wherein said protective housing further comprises a high grade metallic ballistic guard formed inside as part of an inner wall of the housing facing the field of view positioned substantially adjacent and extending above the first and second end surfaces of said first and said second blocks.

7. The periscope construction of claim 6 wherein said at least one layer of transparent armor is rigidly positioned at an angle relative to the field of view no less than 300° to a maximum of 360° which is parallel to the field of view.

* * * * *